United States Patent [19]

Spears

[11] Patent Number: 4,991,646
[45] Date of Patent: Feb. 12, 1991

[54] AIR FLOW DISTRIBUTION BAFFLE

[75] Inventor: Thomas D. Spears, West Amherst, N.Y.

[73] Assignee: General Motors Corporation, Detroit, Mich.

[21] Appl. No.: 527,413

[22] Filed: May 23, 1990

[51] Int. Cl.$^5$ .................................................. F28F 13/06
[52] U.S. Cl. ...................................... 165/122; 165/124
[58] Field of Search ............... 165/122, 124, 138, 903

[56] References Cited

U.S. PATENT DOCUMENTS

| | | | |
|---|---|---|---|
| 1,825,036 | 9/1931 | Young | 165/124 X |
| 1,966,882 | 7/1934 | Bucklen | 237/12.3 |
| 2,032,811 | 3/1936 | Perkins et al. | 165/903 X |
| 2,808,237 | 10/1957 | Fosnes | 165/903 X |
| 3,374,831 | 3/1968 | Sieverding | 165/122 |
| 4,356,965 | 11/1982 | Matsushima et al. | 237/12.3 |
| 4,440,212 | 4/1984 | Tanino et al. | 165/12 |
| 4,531,453 | 7/1985 | Warman et al. | 98/2.11 |
| 4,712,611 | 12/1987 | Witzel | 165/122 |
| 4,779,672 | 10/1988 | Seikou et al. | 165/41 |
| 4,821,796 | 4/1989 | Schulz | 165/122 |

FOREIGN PATENT DOCUMENTS

| | | | |
|---|---|---|---|
| 1019997 | 1/1953 | France | 165/122 |
| 1475284 | 2/1967 | France | 165/122 |

*Primary Examiner*—Martin P. Schwadron
*Assistant Examiner*—Allen J. Flanigan
*Attorney, Agent, or Firm*—R. L. Phillips

[57] ABSTRACT

A baffle between the blower and the heat exchanger of a ventilation system evenly distributes air flow over the heat exchanger surface which air flow otherwise would be concentrated along one wall of the system housing and through a localized portion of the heat exchanger. The baffle has a flat panel mounted on the wall adjacent the concentrated air flow and has spaced curved vanes extending into the air stream to direct portions of the stream away from the wall. Diffusers between and downstream of the vanes spread out air currents which pass between the vanes.

4 Claims, 1 Drawing Sheet

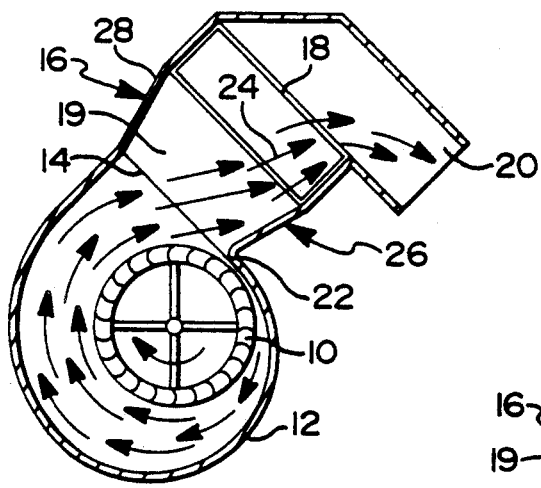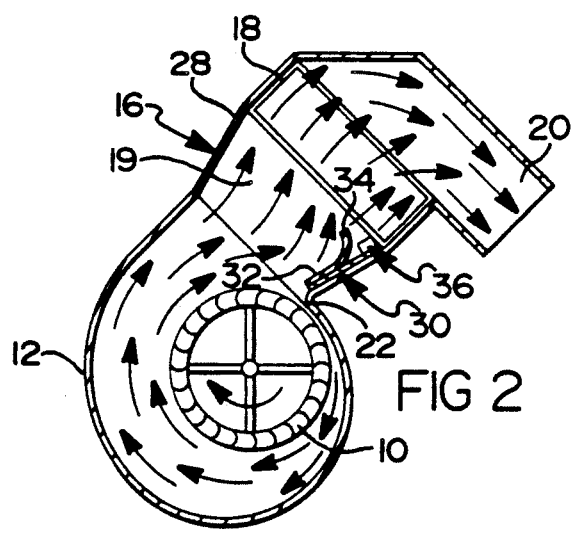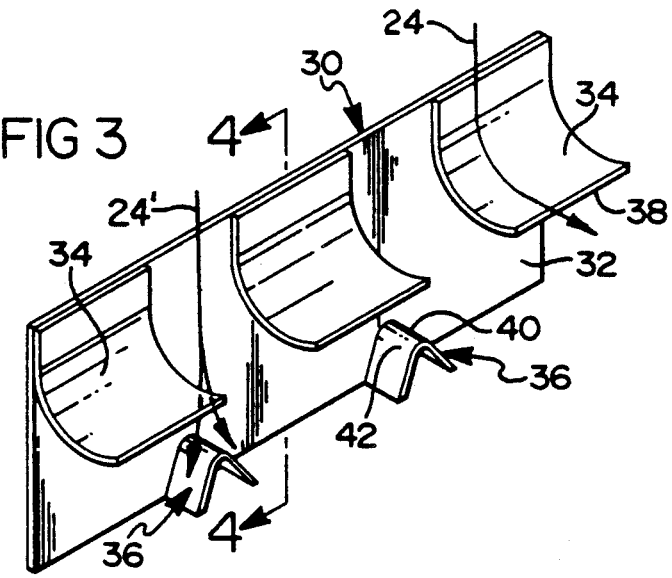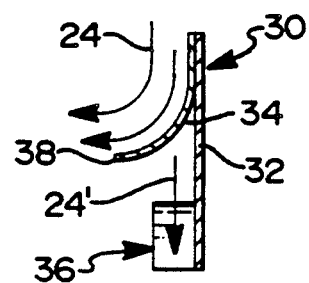

AIR FLOW DISTRIBUTION BAFFLE

FIELD OF THE INVENTION

This invention relates to an air flow distribution baffle and particulary to such a baffle for improving the uniformity of air flow to a heat exchanger.

BACKGROUND OF THE INVENTION

In automotive heating and air conditioning systems, the air flow through a heat exchanger core is induced by a blower upstream of the core and connected by a passage to the core. The radial flow squirrel cage type of blower is commonly used due to its efficiency and compactnes. Such blower, however, do produce an output which is nonuniform across the passage. This is illustrated in the prior art example of FIG. 1. There, a radial flow blower wheel 10 housed in a snail-shaped shroud 12 supplies air to the shroud opening 14. A ventilation case 16 containing a heat exchanger core 18 for either a heater or an air conditioner is connected to the shroud 12 at the opening 14 to define a divergent air passage 19 between the blower and the heat exchanger. The shroud 12 and case 16 together comprise a housing. Downstream of the core 18, the ventilation case 16 forms a duct 20.

The blower wheel 10 pulls air into the shroud 12. The amount of air moved by the blower increases as a point on the wheel moves within the shroud from the edge 22 of the opening. The shroud is positioned progressively further from the wheel in the direction of rotation to accommodate the growing volume of air. The blower action produces a stream 24 of high velocity air which is ejected from the shroud opening 14. The high velocity stream 24 tends to stay together, hugging the wall 26 of the case which is adjacent the edge 22. A relatively low velocity movement of air passes through the region between the stream 24 and the case wall 28 which is opposite the wall 26. That airflow pattern forces most of the air through a very small area of the core. In the case of a heater core, the coolant within the core is reduced to a low temperature in the small area and is thus limited in the rate of heat transfer so that the majority of the air is poorly heated. The coolant in the remainder of the core is cooled only slightly due to the low rate of air flow in that region, although that small amount of air is well heated. Thus the overall heat transfer rate is poor. Such operation also results in hot and cold air streams emerging from the core, and they are difficult to mix uniformly. A further effect of passing the majority of the air through a small area of the core is a very high pressure drop through the core.

It is desirable that the air velocity be somewhat uniform over the core area for optimum heat transfer, low pressure drop and uniform temperature. This has been accomplished in the past by providing a plenum between the blower and heat exchanger core to allow the air stream to settle before passing through the core. However, in some applications space constraints require that a heat exchanger be placed nearly perpendicular to the wall 26 of the case and so close to the shroud opening 14 that there is no room for a plenum.

U.S. Pat. No. 4,712,611 to Witzel discloses a blower and a heat exchanger with a profiled grid positioned in the flow of air from the blower to spread the air so that it substantially covers the heat exchanger area. According to Witzel, the flow in the absence of the grid is mainly in the center of the heat exchanger. The grid imposes a distributed flow resistance in the air path so that the air flow is deflected in accordance with the grid permeability and configuration to increase the flow at the edges of the heat exchanger.

SUMMARY OF THE INVENTION

It is therefore an object of the invention to provide a baffle between a blower and heat exchanger core to evenly distribute the air flow and to realize a net reduction in pressure drop through the core.

The invention is carried out in a heat exchanger system having a heat exchanger core and a blower which produces a nonuniform air flow in a preferential path toward the core by a distribution baffle in the air flow for diffusing the air flow comprising: a main baffle panel disposed in the preferential path and parallel to the air flow from the blower, means for directing a portion of the air flow in a direction transverse to the panel including a plurality of spaced bending surfaces protruding from the panel into the air flow, whereby some of the air is directed out of the preferential path to improve the air flow distribution and the remainder of the air remains in the preferential path, and means for diffusing the remainder of the air in the preferential path comprising laterally deflecting elements on the panel downstream of the bending surfaces and in the path of the said remainder of the air, so that the remainder of the air is distributed evenly.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a cross section of a blower and heat exchanger arrangement showing the air flow pattern in the absence of a distribution baffle, FIG. 2 is a cross section of a blower and heat exchanger arrangement including a distribution baffle according to the invention and showing the improved the air flow pattern, FIG. 3 is an isometric view of the distribution baffle according to the invention, and FIG. 4 is a cross section of the baffle taken along line 4—4 of FIG. 3.

DESCRIPTION OF THE INTENTION

FIG. 2 is the same structure as FIG. 1 with the addition of an air distribution baffle 30 to redirect the air flow from the stream 24 for substantially uniform velocity distribution across the heat exchanger 18. The baffle 30, which is also shown in FIGS. 3 and 4, comprises a main panel 32 mounted parallel to the wall 26, bending surfaces of vanes 34 extending from the panel 32 away from the wall 26 and into the air passage 19 and a pair of diffusers 36 at the downstream edge of the panel 32.

The vanes 34 are curved outwardly so that they each define a bending surface that is concave in the upstream direction. The bending surfaces are tangential to the panel at their point of attachment to the panel and terminate in a free end 38 which extends perpendicular to the panel 32. The vanes 34 are laterally spaced so that some air can bypass the vanes. Each diffuser 36 is aligned with a space between the vanes 34 and is positioned downstream of the vanes to intercept air passing between the vanes 34. The diffuser geometry is generally triangular with two sloped planar sides 42 mounted perpendicular to the panel 32 and meeting at an apex 40 which points upstream.

During blower 10 operation the air stream 24 passes over the baffle 30. The part of the stream 24 that meets the curved bending surfaces 34 is deflected outwardly in a direction normal to the panel and is thus directed toward the wall 28 to increase the air flow near wall 28 and the center of the passage 19 while decreasing the air flow near the wall 26. The portions 24' of the stream 24 that passes between the vanes 34 remain near the wall 26 and meet the diffusers 36 which laterally deflect the flow to break up the portions 24' into a more uniform pattern. As depicted by the streamlines in FIG. 2, the overall air flow through the heat exchanger is generally uniform.

The effect of the more uniform pattern relative to the pattern shown in FIG. 1, is to allow each part of the heat exchanger to operate at its optimum efficiency. In addition, the air is heated uniformly so that hot and cold streams are not generated. The pressure drop across the heat exchanger is reduced by eliminating the high velocity stream in a small area. The baffle 30 introduces a pressure drop but this particular baffle design has a relatively low pressure drop which is less than the reduction of pressure drop across the heat exchanger. Thus there is a net reduction of pressure drop for the system.

The embodiments of the invention in which an exclusive property of privilege is claimed are defined as follows:

1. In a heat exchanger system having a heat exchanger core and a blower which produces a nonuniform air flow in a preferential path toward the core, a distribution baffle in the air flow for diffusing the air flow comprising:

a main baffle panel disposed in the preferential path and parallel to the air flow from the blower, means for directing a portion of the air flow in a direction transverse to the panel including a plurality of spaced bending surfaces protruding from the panel into the air flow, whereby some of the air is directed out of the preferential path to improve the air flow distribution and the remainder of the air remains in the preferential path, and means for diffusing the remainder of the air in the preferential path comprising laterally deflecting elements on the panel downstream of the bending surfaces and in the path of the said remainder of the air, so that the remainder of the air is distributed evenly.

2. In a heat exchanger system having a housing including opposed walls, a heat exchanger in the housing, a radial flow blower in the housing upstream of the heat exchanger for inducing air flow into the housing and toward the heat exchanger wherein the blower produces a preferential air flow along one wall of the housing and a low flow region at the opposite wall, and a distribution baffle between the blower and the heat exchanger, the baffle comprising:

a main panel mounted along the said one wall of the housing adjacent the preferential air flow, a plurality of laterally spaced deflecting surfaces extending from the panel into the air flow, the surfaces being shaped to redirect a portion of the air flow away from the wall into the low flow region to thereby balance the flow distribution in the housing, and diffusers aligned with the spaces between the deflecting surfaces and downstream of said surfaces for laterally distributing the portion of the air flow along the panel which passes between the deflecting surfaces, whereby substantially uniform air flow occurs at the heat exchanger.

3. The invention as defined in claim 2 wherein each said deflecting surface is concave toward the upstream direction and is shaped to produce air flow substantially normal to the said one wall.

4. The invention as defined in claim 2 wherein each deflecting surface is a curved surface and one end of each said curved surface is tangent to the main panel and secured thereto, and the other end of each curved surface extends away from and normal to the main panel, so that the curved surface redirects a portion of the air flow away from the main panel.

* * * * *